3,510,456
CURABLE URETHANE COMPOSITIONS
Donald R. Carr, Buffalo, and S. Edmund Berger, Tonawanda, N.Y., assignors to Allied Chemical Corporation, New York, N.Y., a corporation of New York
No Drawing. Filed June 23, 1966, Ser. No. 559,750
Int. Cl. C08g *22/18*
U.S. Cl. 260—75                            3 Claims

ABSTRACT OF THE DISCLOSURE

Production of curable urethane compositions having an extended pot-life at elevated temperatures consisting essentially of the reaction product of an isocyanate terminated prepolymer derived from methylene-bis(4-cyclohexylisocyanate) and a chain-extending compound containing groups reactive with said isocyanate.

---

This invention relates to curable urethane compositions having an extended pot life. More particularly, it relates to urethane prepolymer compositions containing a chain extender which remain pourable and workable for prolonged periods and to the preparation thereof.

Urethane elastomers comprise a well known class of materials having varied applications. Such products can be cast or molded in intricate shapes and forms to produce such diverse articles as solid tires, anti-vibration mountings, impellers, propellers, bushings, bearings, chute linings, gears, belts, protective equipment, helmet liners, gas masks, and the like. The general method of preparing such elastomer materials involves the preliminary formation of a prepolymer by co-reacting a polyfunctional diol, e.g., a polyester having terminal hydroxyl groups or a polyether glycol, with an excess of polyisocyanate. The resultant prepolymer, containing terminal isocyanato groups, and free isocyanate, is cured by reaction with a polyfunctional cross-linking or chain extending agent containing active hydrogen, such as water, an aromatic or aliphatic diamine, an aliphatic diol, and the like. Non-reactive ingredients such as fillers, dyes, antioxidants etc. may be added, as desired at this stage.

The curing step is carried out by first admixing, and preferably thoroughly blending, the prepolymer with the chain extending agent, usually at elevated temperature. The mixture then is poured into molds and hardened by the application of heat and/or pressure, or it is masticated on heated rolls and formed into sheets.

In most instances, the mixture of prepolymer and chain extending agent remains in a fluid pourable condition for a relatively short time, that is, such compositions have a relatively short "pot life." This necessitates the preparation of such mixtures in small batches, usually the amount to fill one or several forms. This, obviously, is inconvenient and expensive, since it is time consuming and not conducive to large scale manufacture. Moreover, the short pot life of these curable compositions often makes the filling of the molds, especially those of intricate shape, difficult and incomplete, and the entrapment of gas bubbles more common.

Another observation has been that curable urethane compositions will not remain sufficiently fluid to be poured into molds when the composition is maintained above ambient temperatures for extended periods. In view of the fact that temperatures above ambient are necessary for the satisfactory preparation of the prepolymer and cured elastomer, this inadequacy adds to the difficulties of attaining economical production.

It is, therefore, an object of this invention to provide curable urethane compositions possessing a desirably long pot life.

Another object is to provide curable urethane compositions which readily cure at relatively low temperatures, yet, which remain in fluid, pourable state for sufficient periods to permit adequate mixing of the urethane prepolymer and chain extending agent and which allow the preparation of such compositions in relatively large quantity.

A further object is to provide improved urethane elastomers from these curable urethane compositions.

Other objects of this invention will be obvious from the following description.

The present invention is concerned with curable urethane compositions having desirably extended pot life, i.e. they remain sufficiently fluid to be poured into molds even when maintained at above ambient temperatures for extended periods, said compositions consisting essentially of an intimate mixture of an isocyanate terminated prepolymer derived from methylene bis(4-cyclohexylisocyanate) and a chain extending agent which contains groups reactive with isocyanate, such as for example an arylene diamine, an aliphatic glycol or an aminoalcohol.

The use of a urethane prepolymer which is prepared by reacting a hydroxy terminated polyol, such as a polyester having a molecular weight of at least about 1000 and a hydroxyl number of at least about 40, with an excess of methylene-bis(4-cyclohexylisocyanate) when admixed with a conventional chain extending agent, for example an arylene diamine such as 4,4'-methylene-bis-(2-chloroaniline), results in a curable urethane composition having an extended pot life, i.e., said composition can be held at temperatures above ambient for substantially longer periods without losing its fluid character than analogous compositions derived from urethane prepolymers prepared from polyisocyanates other than methylene-bis-(4-cyclohexylisocyanate).

The curable urethane compositions of this invention can be prepared in the conventional manner. In accordance with a preferred mode of preparing such compositions, 100 parts by weight of a polyester reaction product of ethylene glycol and propylene glycol with adipic acid, having a molecular weight of about 2100 and a hydroxyl number of 50 is heated to 45° to 50° C., and to it are added 41.5 parts by weight of methylene bis(4-cyclohexylisocyanate). The resultant mixture is agitated and heated about 80° C. for about 3 hours. Thereafter, based on the content of free isocyanato groups present in the urethane prepolymer, an amount of 4,4'-methylene-bis-(2-chloroaniline) required to react with about 90% of said free isocyanato groups is added. Both the prepolymer and the diamine are heated to 110° C. prior to mixing. The mixture is vigorously agitated and then poured into a mold, preheated to about 130° C. Pot life of the mixture can be determined by inserting a wooden tongue depressor into the hot mixture and removing the depressor. When the void made by the depressor does not disappear, the mixture is no longer porable and the pot life period is said to have ended.

The mixture when poured into the preheated mold can be cured in any known manner, for example, it can be heated at 275° F. under 40,000 lbs. pressure for 10 minutes and thereafter post cured for 3 hours at 130° C.

The resultant elastomers after curing in a conventional manner possess excellent physical properties such as high tensile strength, hardness, resistance to solvents, abrasion resistance, and the like which properties characterize the urethane elastomers, in general.

The amount of isocyanate used to prepare the prepolymers is selected so as to provide an excess of isocyanato groups over that required to react with the hydroxy groups of the polyester or polyether component. Preferably this excess should be such as to provide at least 3.0% and especially from 5 to 7% by weight of free isocyanato groups in the prepolymer.

The polyol component used to prepare the prepolymer can be either a polyester polyol including a polyesteramide) or polyether polyol. Preferably the polyol is a linear compound having terminal hydroxyl groups and a functionality of about 2. Polyesters and especially linear polyesters are preferred. Such compounds are well known in this art and are prepared in a conventional manner by condensation of one or a mixture of dibasic acids and one or a mixture of glycols. Representative examples of the dibasic acids which can be used in the preparation of these polyesters are succinic, glutaric, adipic, pimelic, suberic, azelaic, sebacic, terephthalic acids and the like. The glycol component is typified by the following examples: ethylene glycol, propylene glycol, butylene glycol, tetramethylene glycol and hexamethylene glycol. Polyesters derived from adipic acid and a mixture of ethylene and propylene glycols are preferred.

The polyesters should have a molecular weight of at least 1000 and preferably between about 1500 and about 2500. Their hydroxyl number should be between about 40 and about 115 and the acid number below 5.

The polyol component may also be a polyether polyol typical of which are the polyalkylene ether glycols which are well known in this art and which are believed to have the general formula

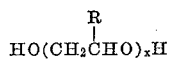

wherein R is hydrogen or a lower alkyl group and $x$ is an integer of such magntiude that the molecular weight of the glycol is within the approximate range of 500 to 2500, preferably within the range of about 750 and about 1500. Suitable glycols of this character include polyethylene ether glycol
polypropylene ether glycol
polybutylene ether glycol Polyether glycols of this class can be obtained by condensation of an alkylene oxide, or mixture of alkylene oxides, such as ethylene oxide, propylene oxide and the like, with a polyhydric alcohol, such as ethylene glycol in the presence of a suitable catalyst, e.g., trimethylamine, potassium hydroxide, etc. The preparation of such polyether glycols is well known in this art and several are commercially available.

In the formation of the urethane elastomer the prepolymer containing free isocyanato groups is caused to react with a chain extending agent. As is well known, these agents may include arylene diamines, alkylene diamines, lower molecular weight glycols, and aminoalkanols. Other types of chain extenders include for example water, maleic acid, etc. These reagents, which are sometimes referred to as "hardeners" probably also react by a cross-linking mechanism. The arylene diamines are, in general, the most active, i.e., most rapidly reacting, whereas the alkylene glycols are the least reactive group of such reagents. The arylene diamines are the preferred class of chain extenders since by their use urethane elastomers having excellent tensile strength, hardness and elastic modulus can be produced. Typical examples of this preferred class of reactants are the following:

4,4'-methylene-bis-(2-chloroaniline)
4,4'-methylene-bis-(2-bromoaniline)
4,4'-methylene-bis-(2-methoxyaniline)
4,4'-methylene-bis-(2-ethylaniline)
4,4'-methylene-bis-(2-n-hexylaniline)
naphthalene-1,5-diamine
2,2'-dichlorobenzidine
dianisidine The amount of the chain extender component used is generally within the range of about 80% to 100% of the amount theoretically required to react with all the free isocyanato groups in the prepolymer. Expressed in different terms the $NH_2/NCO$, or other reactive group when a diamine extender is not employed, is preferably in the range of about 0.8 to 1.0:1.0 and especially 0.9 to 1.0. The selection of the particular extender or mixture thereof is dependent to a large extent upon the particular group of properties desired in the final cured elastomer product. These criteria are thoroughly discussed in the many patents and publications in this field and hence are well known to those skilled in this art.

The following examples will illustrate the present invention and include the best mode presently known of carrying it out. It should be emphasized, however, that the example given herein is purely illustrative and our invention is not to be limited to the details set out therein since variations in said details are possible without departing from the scope or spirit of the invention, as will be obvious to those skilled in this art. Parts and percentages are by weight and temperatures are given in degrees centigrade, unless otherwise specified.

EXAMPLE 1

Control experiment

After heating 100 parts of a polyester, prepared from a mixture of adipic acid and a mixture of glycols containing 80 mol percent of ethylene glycol and 20 mol percent of propylene glycol and having an average molecular weight of about 2100, a hydroxyl number of about 57 and an acid number below 3, to 45°–50°, 27.5 parts of a mixture of 80% 2,4- and 20% 2,6-tolylene diisocyanates were added. The mixture was heated to and maintained at 80° for 3 hours. The resultant prepolymer contained 6.84% free NCO.

The prepolymer, 100 parts, was heated to 110° and to it were added 19.55 parts of 4,4'-methylene-bis-(2-chloroaniline), representing 90% of the theoretical amount required to react with all the free isocyanato groups. The mixture was agitated vigorously for about 15 to 25 seconds. The mixture is then poured into a mold preheated to 130°. After 47 seconds in the mold, the depression created by inserting a wood tongue depressor in the surface of the mixture did not disappear on removal of the depressor. By this test, the pot life of this curable mixture was determined to be 47 seconds.

EXAMPLE 2

A mixture of 200 parts of the ethylene propylene adipate polyester described in Example 1 above and 83 parts of methylene-bis-(4-cyclohexylisocyanate) was heated to and maintained at 78° to 80° for 3 hours. The mixture was permitted to cool by standing at ambient temperature for about 16 hours. The prepolymer contained 6.07% free isocyanato groups.

A 70 part portion of this prepolymer was heated to 110° and to it were added 12.1 parts of 4,4'-methylene-bis-(2-chloroaniline) which also was heated to 110°. The mixture was agitated vigorously for about 30 seconds and then poured into a mold preheated to 130°. By the test described in Example 1 above the pot life of this curable mixture was determined to be 20 minutes.

It can thus be seen that an effective means of preparing curable urethane compositions with desirably long pot life has been provided. This method is simple to carry out, does not require any unusual apparatus or components and is generally applicable to the more efficient preparation of urethane elastomers on a large scale.

We claim:

1. A curable urethane composition having an extended pot life at elevated temperatures consisting essentially of an intimately blended mixture of urethane prepolymer which is the reaction product of a polyol and methylene-bis-(4-cyclohexylisocyanate) and 4,4' - methylene - bis-(2-chloroaniline) in an amount of 80% to 100% of the theoretical amount required to react with all the free isocyanato groups present in the prepolymer.

2. A composition as claimed in claim 1 wherein said polyol is a polyester reaction product of ethylene glycol, propylene glycol and adipic acid.

3. A curable urethane composition having an extended pot life at elevated temperatures consisting essentially of an intimately blended mixture of a urethane prepolymer which is the reaction product of ethylene propylene adipate polyester having an average molecular weight of about 2100 and a hydroxyl number of about 57, an excess of methylene-bis-(4-cyclohexylisocyanate) and 4,4'-methylene-bis-(2-chloroaniline).

References Cited
UNITED STATES PATENTS

| Re. 24,514 | 12/1958 | Hoppe et al. | 260—2.5 |
| 2,929,800 | 3/1960 | Hill | 260—77.5 |
| 3,107,235 | 10/1963 | Larson et al. | 260—75 |

OTHER REFERENCES

Gudgeon et al.: Journal of the Oil & Color Chemists, vol. 42, No. 10 (October 1959), pages 677 and 684.

Interview with Professor Otto Bayer, PB 45246, interview held on July 5, 1946, 8 pages.

DONALD E. CZAJA, Primary Examiner

M. J. WELSH, Assistant Examiner

U.S. Cl. X.R.

260—77.5